United States Patent [19]

Rimmer

[11] E Re. 29,624

[45] Reissued May 9, 1978

[54] FLUID DISTRIBUTION APPARATUS

[75] Inventor: Ronald Rimmer, Cheltenham, England

[73] Assignee: Dowty Fuel Systems Limited, Cheltenham, England

[21] Appl. No.: 765,008

[22] Filed: Feb. 2, 1977

Related U.S. Patent Documents

Reissue of:

[64] Patent No.: 3,827,460
Issued: Aug. 6, 1974
Appl. No.: 223,258
Filed: Feb. 3, 1972

[30] Foreign Application Priority Data

Feb. 8, 1971 United Kingdom ..... 4158/71

[51] Int. Cl.[2] ..... F15C 1/16

[52] U.S. Cl. ..... 137/809; 137/813; 239/404

[58] Field of Search ..... 137/808, 809, 810, 812, 137/813, 541, 543.17, 513.7; 73/203, 205, 207, 214, 194 C; 138/43, 44, 45, 46; 239/404; 60/39.74 R; 123/33 R, 140 MC

[56] References Cited

U.S. PATENT DOCUMENTS

| | | | |
|---|---|---|---|
| 2,603,535 | 7/1952 | Ipsen et al. | 239/404 |
| 3,029,029 | 4/1962 | Webster | 239/404 |
| 3,276,259 | 10/1966 | Bowles et al. | 137/813 X |
| 3,410,291 | 11/1968 | Boothe et al. | 137/810 X |
| 3,478,960 | 11/1969 | Taylor | 137/805 X |
| 3,513,865 | 5/1970 | Van Der Heyden | 137/813 |
| 3,592,213 | 7/1971 | Smith | 137/809 X |
| 3,638,672 | 2/1972 | Smith | 137/813 |

*Primary Examiner*—William R. Cline
*Attorney, Agent, or Firm*—Young & Thompson

[57] ABSTRACT

This invention relates to a fluid-distribution apparatus in which one main fluid inlet flow is divided substantially equally between a number of outlets for example as the feeding of a plurality of burners on a gas turbine engine from a single fuel supply. At low total flow rates the difference in height of the various outlets can adversely effect the equality of distribution of liquid between the outlets and it is known to provide a restrictor in series with each outlet to improve the flow division between the outlets. However, where there is a large range of flow rates, the simple restrictors which are effective at low flow rates will cause a very substantial pressure loss at high flow rates. Further a simple restrictor essentially involves a passage of small cross-section which can become blocked by solid particles within the liquid. The present invention substitutes vortex chamber devices for the simple restrictors, arranged to provide a predetermined unique relation between flow rate and pressure drop to ensure effective equalisation at low flow rates and to require only a moderate pressure drop at high flow rates. The vortex chamber devices further are less liable to blockage by solid particles.

3 Claims, 5 Drawing Figures

FLUID DISTRIBUTION APPARATUS

Matter enclosed in heavy brackets [ ] appears in the original patent but forms no part of this reissue specification; matter printed in italics indicates the additions made by reissue.

This invention relates to a fluid flow distribution apparatus intended to distribute a main fluid flow substantially equally between a number of outlets.

It is well known that fluid flow distribution apparatus may use restrictors to equalise flow between the outlets but such apparatus has the disadvantage that the restrictors to produce the necessary restrictive effect must be of small dimensions and are thus liable to obstruction by solid particles that may be contained within the fluid. Also such restrictors involve excessive pressure drop at high flow rates.

The object of the present invention is to provide a fluid flow distribution apparatus of comparatively small dimensions which does not involve flow passages of very small cross-section.

In accordance with the present invention a fluid flow distribution apparatus has a main inlet, a plurality of devices each having a vortex chamber, a tangential primary inlet to each vortex chamber, an outlet from each vortex chamber coaxial therewith, a secondary inlet for each vortex chamber offset from the central axis thereof, a primary manifold connecting the main inlet to all primary inlets, a secondary manifold connected to all secondary inlets, and a spring loaded check valve arranged to permit fluid flow from the main inlet to the secondary manifold when pressure in the secondary manifold falls below pressure in the main inlet by more than a predetermined amount.

Figure 1:
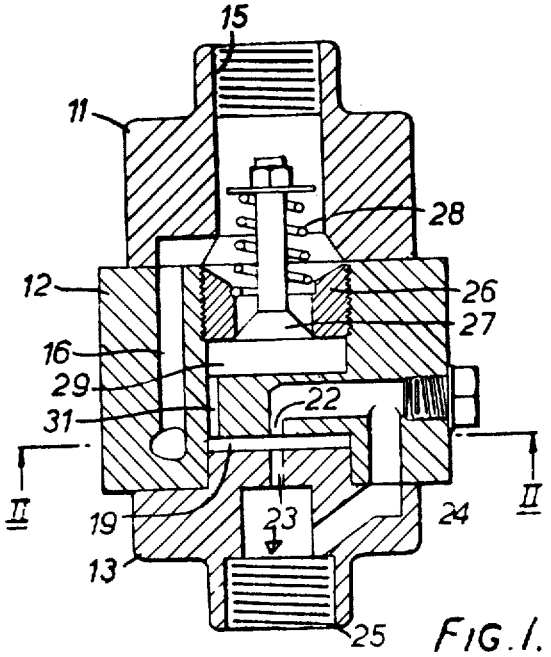
Figure 5:
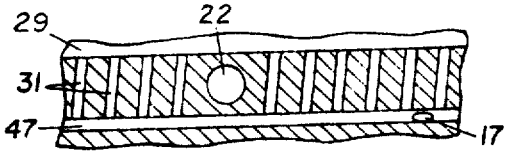
Figure 2:
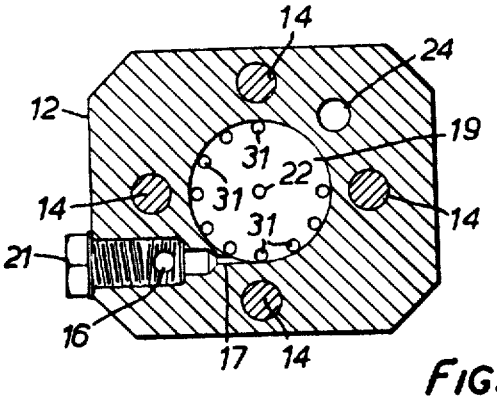
Figure 3:
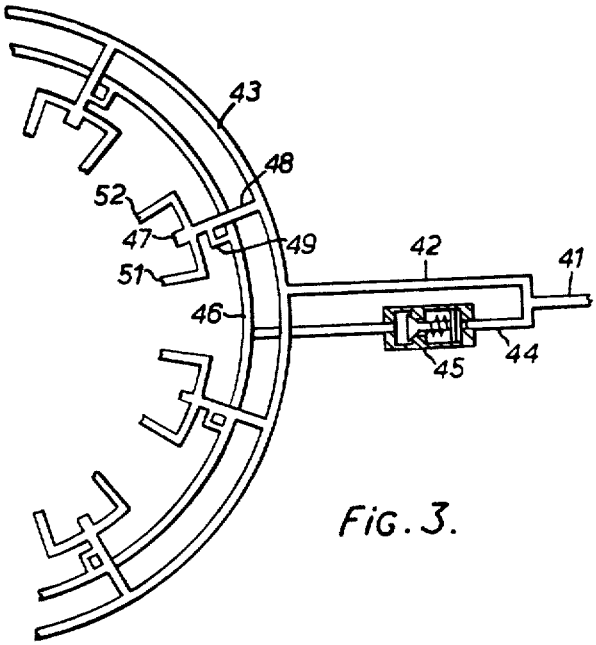
Figure 4:
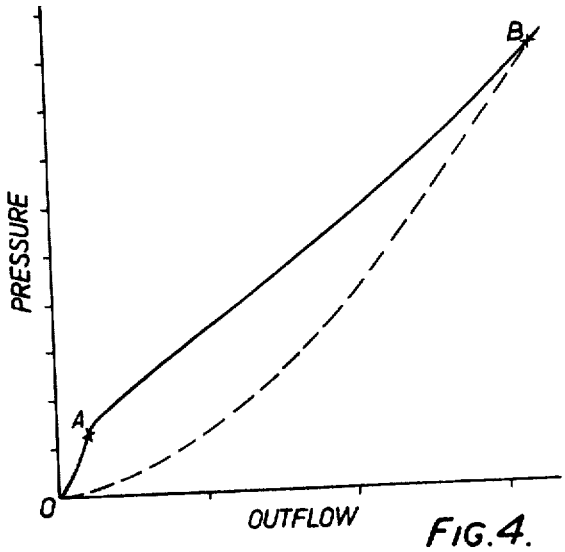

Two embodiments of the invention will now be particularly described with reference to the accompanying drawings, in which FIG. 1 is a longitudinal section of a vortex chamber device, FIG. 2 is a transverse section on the line II—II of FIG. 1, FIG. 3 is a diagram of a fuel flow distribution apparatus for a gas-turbine engine incorporating a plurality of vortex devices, FIG. 4 is a graph representing the performance of the flow distribution apparatus in accordance with the invention, and FIG. 5 is a fragmentory developed cross-sectional view of one arrangement of orifices that feed the vortex chamber.

The vortex chamber of FIG. 1 has a body comprising three main parts 11, 12 and 13 held together by bolts 14. The main inlet 15 is in the part 11 and is connected from a position 16 in the part 12 to an orifice 17 which opens tangentially into the periphery of the vortex chamber 19. The orifice 17 forms the primary inlet into the vortex chamber. The vortex chamber is formed by a circular walled gap between parts 12 and 13. The access opening in the part 12 for drilling the orifice 17 is closed by a screw plug 21.

The vortex chamber 19 has its outlet formed on its central axis as by coaxial openings 22 and 23 in the body parts 12 and 13.

The opening 22 is connected by a passage 24 in the body parts 12 and 13 to an outlet 25 which is common to both openings 22 and 23.

The main inlet 15 connects to a check valve seat 26 against which a movable poppet valve element 27 is loaded by a spring 28. Fluid can flow from the main inlet 15 through the check valve to a chamber 29 in the body part 12 which is coaxial with the vortex chamber 19. A number of orifices 31 form the secondary inlet to the vortex chamber and extend from the chamber 29 into the peripheral portion of the vortex chamber 19. The orifices 31 are parallel to the central axis of the vortex chamber whereby fluid flow from the check valve 26, 27 will enter the vortex chamber without rotation about the central axis. Alternatively the orifices 31 may have similar slight inclinations relative to the central axis as shown in FIG. 5 so that fluid entering the vortex chamber has a component of rotation about the central axis.

In operation of the device, fluid at low flow rates passing through the main inlet 15, flows through the passage 16 and the primary inlet 17 so that a swirl or vortex flow is established in the chamber 19. The resistance to fluid flow through the device at low flow rates is substantially due to pressure difference established between the periphery and the centre of the vortex chamber. Up to a predetermined overall pressure difference between the main inlet and the outlet the pressure rises steeply in relation to flow following a square law between the points O and A in FIG. 4.

At the point A the check valve starts to open so that fluid enters the vortex chamber 19 through the orifices 31. The pressures in the inlet 15 and in chamber 29 produce opposing forces on the valve 27 and the valve will open when the difference of these pressures overcomes the loading of spring 28. The difference of these pressures is particularly due to pressure loss in fluid flow through the orifice 17. Thus the point A is determined by a predetermined flow rate of fluid through the primary inlet into the vortex chamber.

If the orifices 31 forming the secondary inlet, are parallel to the central axis, the fluid entering the vortex chamber from orifices 31 will be without rotation. Alternatively if the orifices 31 are inclined then entry of fluid into the vortex chamber will include a certain degree of rotation. With increase in the flow rate through orifices 31 and the swirling effect produced wholly or in part by the flow from the primary inlet, the pressure difference across the vortex will vary in dependence on the total flow rate. The unbroken line in FIG. 4 between points A and B shows the relation between the overall pressure difference between inlet and outlet and the total flow rate that could be obtained with the device as shown in FIGS. 1 and 2. In particular it will be noted that between the points A and B the line approximates to a straight line. Different arrangements of the primary and secondary inlets and of the check valve may be arranged to produce other relations either linear or non linear between total flow and overall pressure difference. The broken line in FIG. 4 illustrates the relation between the overall pressure difference and total flow that would take place in the device if there were no vortex flow in the vortex chamber.

In designing the device in accordance with the invention the relation between overall pressure difference and total flow will be dependent on the pressure loading of the check valve, the dimensions of the vortex chamber and more particularly the radial positions of the secondary inlets and their arrangement so as to enter the vortex chamber either with or without rotation. It is necessary for the secondary inlets to be offset from the central axis firstly in order to avoid the possibility that secondary flow may pass directly to the outlet when entering the vortex and secondly to enable a pair of outlets to be provided on opposite sides of the vortex chamber at the central axis.

The distribution apparatus shown in FIG. 3 is intended particularly for use with distribution of fuel to a gas-turbine engine. The main inlet 41 has one branch 42 leading to a primary manifold 43 and another branch 44 with a check valve 45 therein leading to a secondary manifold 46. The manifolds 43 and 46 are only partly shown and will connect to several associated vortex chamber devices. Each such device comprises a vortex chamber 47 having a tangential primary inlet supplied by a branch 48 of the primary manifold 43 and a secondary inlet supplied by a branch 49 from the secondary manifold 46. The vortex chamber 47 has two opposed coaxial outlets which supply fuel to two vapourising tubes 51 and 52 leading to the engine combustion chambers.

Each vortex chamber device in FIG. 3 in combination with check valve 45 operates substantially as described with reference to FIGS. 1 and 2 to produce a pressure difference between the main inlet 41 and the outlets of each vortex chamber device, the pressure difference at quite low flow rates being arranged to be substantially greater than the pressure head of fuel between the upper and lower vapourising tubes. In this way flows to the vapourising tubes are substantially equalised.

In the illustrated embodiments the check valve is caused to open when there is sufficient pressure drop in the orifice forming the primary inlet. The pressure drop available for opening the check valve as illustrated will be increased if the orifices forming the secondary inlets are located between the centre and the periphery of the vortex chamber. The check valve shown in the illustrated embodiments may be substituted by any other valve means which can be arranged to remain closed at low total flow rates and to open at high total flow rates. The method of controlling the valve preferably involves the use of a pressure drop dependent on flow rate through the device. For example the valve means may comprise a piston valve which whilst being openable to connect flow from the main inlet to the chamber 29 will not respond to pressure within the chamber 29. The pressure difference for opening such a valve may then be connected from any suitable points of the device such for example as the main inlet 15 and the outlet 25.

A fluid distribution device according to the invention may be quite compact and light in weight having regard to the restricting effect that it produces on the flow of fluid. Further such a fluid distribution device does not involve the use of small orifices.

I claim:

1. A fluid flow distribution apparatus having a main inlet, a plurality of devices each having a *circular* vortex chamber, a tangential primary inlet to each vortex chamber, [an] *a coaxial* outlet from each vortex chamber [coaxial therewith, a] *at least one* secondary inlet for each vortex chamber [offset from the central axis thereof] *in the peripheral portion thereof parallel or nearly parallel to the vortex chamber axis,* a primary manifold connecting the main inlet to all primary inlets, a secondary manifold connected to all secondary inlets, and a spring loaded check valve arranged to permit flow from the main inlet to the secondary manifold when pressure in the *main inlet exceeds pressure in the* secondary manifold [falls below pressure in the main inlet] by more than a predetermined amount.

2. A fluid flow distribution apparatus as claimed in claim 1 wherein each secondary inlet is arranged so that liquid may enter the associated vortex chamber therefrom with rotation about the central axis thereof.

3. A fluid flow distribution apparatus as claimed in claim 1 wherein each vortex chamber includes two separate outlets each coaxial with the vortex chamber and oppositely directed.

* * * * *